(12) United States Patent
Liu et al.

(10) Patent No.: US 10,884,419 B2
(45) Date of Patent: Jan. 5, 2021

(54) FILTER FOR NOISE REDUCTION IN DETECTION IN REMOTE SENSING SYSTEMS

(71) Applicant: GM Cruise Holdings LLC, San Francisco, CA (US)

(72) Inventors: Cheh-Ming Jeff Liu, Thousand Oaks, CA (US); Alexander Charles Standridge, Westlake Village, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 161 days.

(21) Appl. No.: 16/224,472

(22) Filed: Dec. 18, 2018

(65) Prior Publication Data

US 2020/0192387 A1    Jun. 18, 2020

(51) Int. Cl.
| | | |
|---|---|---|
| G05D 1/02 | (2020.01) | |
| G01S 17/34 | (2020.01) | |
| G01S 13/34 | (2006.01) | |
| G01S 7/35 | (2006.01) | |
| G01S 13/931 | (2020.01) | |
| G01S 7/4913 | (2020.01) | |
| G01S 17/931 | (2020.01) | |

(52) U.S. Cl.
CPC ............ G05D 1/0214 (2013.01); G01S 7/352 (2013.01); G01S 7/4913 (2013.01); G01S 13/341 (2013.01); G01S 13/931 (2013.01); G01S 17/34 (2020.01); G01S 17/931 (2020.01); *G01S 2007/356* (2013.01); *G01S 2013/93271* (2020.01)

(58) Field of Classification Search
USPC ........................................................ 701/301
See application file for complete search history.

(56) References Cited

U.S. PATENT DOCUMENTS

| | | |
|---|---|---|
| 5,357,331 A | 10/1994 | Flockencier |
| 5,835,199 A | 11/1998 | Phillips et al. |
| 6,469,778 B2 | 10/2002 | Asaka et al. |
| 6,646,723 B1 | 11/2003 | Dubovitsky et al. |
| 9,575,184 B2 | 2/2017 | Gilliland et al. |
| 9,945,950 B2 | 4/2018 | Newman et al. |
| 10,033,108 B2 * | 7/2018 | Henry ................ H01Q 9/0485 |
| 10,514,446 B1 * | 12/2019 | Wang ................. G05D 1/0231 |
| 2005/0195383 A1 * | 9/2005 | Breed ...................... B60N 2/28 356/4.01 |

(Continued)

*Primary Examiner* — Tyler D Paige
(74) *Attorney, Agent, or Firm* — Medley, Behrens & Lewis, LLC

(57) ABSTRACT

Vehicles, systems, and techniques are provided for noise reduction in detection in remote sensing systems. Noise reduction can be accomplished, in some embodiments, by narrowing a time interval to receive return EM radiation (or, in other embodiments, EM signals representative of the return EM radiation) at a system mounted in a vehicle. The time interval can be narrowed by adjusting the time during which the system can receive the return EM radiation. In other embodiments, rather than adjusting the time interval, a processing unit can remove a portion of data representative of a signal resulting from mixing probe EM radiation and return EM radiation. The data that is removed can be representative of the signal during a leading interval of the defined period during which probe EM radiation is emitted. Such a removal can result in second data representative of the signal during a terminal interval of the defined period.

20 Claims, 13 Drawing Sheets

(56) References Cited

U.S. PATENT DOCUMENTS

| | | | |
|---|---|---|---|
| 2010/0194641 A1* | 8/2010 | Miller | G01S 11/04 342/417 |
| 2016/0131753 A1* | 5/2016 | Brown | G01S 13/10 342/128 |
| 2020/0192387 A1* | 6/2020 | Liu | G05D 1/0214 |
| 2020/0209362 A1* | 7/2020 | Chawla | G01S 7/4815 |

* cited by examiner

FILTER FOR NOISE REDUCTION IN DETECTION IN REMOTE SENSING SYSTEMS

BACKGROUND

Several types of remote sensing systems permit detecting objects and their respective velocities in distant regions of space relative to locations of the remote sensing systems. Examples of remote sensing systems include radar systems and light detection and ranging (lidar) systems. In some remote sensing systems, return signals can have parts. A first part corresponds to frequency modulated continuous wave (FMCW) signals and a second part corresponds to continuous wave (CW) signals. Detection in such a remote sensing system includes the identification of the frequencies of CW return signals to determine delay (or range) and Doppler shift (or relative speed) between the remote sensing system and objects in a region relative to the remote sensing system. The FMCW return signals constitute a leading portion of reception and are unused in detection.

The farther an object is relative to the remote sensing system, the smaller the strength of the return signals. Path losses can contribute to the reduction of strength for long distances. In addition, duty cycle of the CW part of the return signals is smaller as the object distance increases relative to the remote sensing system. Thus, at long distances, path losses and narrow duty cycles can complicate the detection in the remote sensing system in the presence of noise. Therefore, much remains to be improved in conventional technologies to reduce noise in detection in traditional remote sensing systems.

SUMMARY

The following is a brief summary of subject matter that is described in greater detail herein. This Summary is not intended to be limiting as to the scope of the claims.

The disclosure recognizes and addresses, in at least some embodiments, the issue of noise reduction in the detection of electromagnetic (EM) signals in remote sensing systems that probe reflected EM radiation to detect objects within an environment. In particular, for long-range detection, the reflected EM radiation strength is relatively small and noise (thermal noise, background EM radiation, etc.) can be a dominant factor in detectability and/or false alarm rates. The disclosure provides vehicles, systems, and techniques that, individually or in combination, permit or otherwise facilitate reducing noise in detection in a remote sensing system. In some embodiments, noise reduction can be accomplished by narrowing a reception interval during which return EM radiation (or, in some embodiments, EM signals representative of the return EM radiation) is received at the remote sensing system. The reception interval is narrowed relative to a defined period during which EM radiation is emitted to probe the presence of objects in a region relative to the remote sensing system. In addition, the narrowed reception interval corresponds to a terminal interval of the defined period. Thus, such a narrowed reception interval can permit reducing incoming noise power while preserving return EM signals representative of a beat signal resulting from reflected EM radiation and present in the terminal portions of the defined period.

The reception interval can be narrowed by adjusting the time during which a receiver module (or receiver circuitry therein) can sense return EM radiation impinging on the remote sensing system. To that end, in one embodiment, the remote sensing system can include a switching component that can adjust the duty cycle of the receiver module.

In other embodiments, rather than adjusting the time interval during which return EM radiation is sensed at the receiver module, a processing unit can filter or otherwise remove a portion of data representative of a mixed signal resulting from mixing probe EM radiation and return EM radiation. The portion of data that is removed can correspond to data representative of the mixed signal during a leading interval of the defined period during which probe EM radiation is emitted. Accordingly, filtering or otherwise removing such data can result in second data representative of the mixed signal during a terminal interval of the defined period. Therefore, the second data can present enhanced signal-to-noise ratio (SNR) with respect to the data prior to filtering. The processing unit can operate on the second data in order to detect an object, e.g., determine a position of the object within an environment nearby the remote sensing system. In addition, or as an alternative, the processing unit can operate on the second data in order to determine the velocity of the object relative to the remote sensing system.

The narrowing of a reception time interval in remote sensing systems in accordance with this disclosure can be implemented in hardware or firmware. Such remote systems can be mounted on a vehicle (autonomous or otherwise). While some embodiments of the disclosure are illustrated with reference to an automobile, the disclosure is not so limited. Indeed, the principles and practical elements disclosed herein also can be applied to other types of vehicles (aircrafts (unmanned or otherwise), farm equipment, and the like).

The principles and practical elements of the disclosure can be implemented in radar systems, lidar systems, and most any remote sensing system that probes reflected modulated EM radiation to detect objects in the surroundings of the remote sensing system. Further, while embodiments of the disclosure are illustrated with reference to electromagnetic radiation modulated according to an FMCW waveform and related signals, the disclosure is not limited in that respect. Indeed, the principles and practical elements disclosed herein also can be implemented in remote sensing that rely on electromagnetic radiation modulated according to amplitude modulated continuous wave (AMCW) waveforms and related signals. Each of such waveforms can include, for example, a sawtooth waveform, a triangular waveform, or the like.

Embodiments of the disclosure provide several technical benefits or improvements over commonplace approaches to detection performed by remote sensing systems. For example, in some embodiments, noise can be reduced in a detection stage of a remote sensing system. In such embodiments, noise reduction can be accomplished without modifications to hardware present in conventional remote sensing systems. As another example, some embodiments provide flexibility in the amount of noise reduction that can be attained by utilizing a narrow terminal reception interval. Noise can be reduced essentially proportionally to the terminal reception interval relative to a defined period of transmission of probe electromagnetic radiation. In addition, or as another example, by adjusting the terminal reception interval, signal-to-noise ratio can be enhanced for long-distance object detections. Thus, long-range detectability in a remote sensing system may be enhanced controllably. These and other technical benefits can be realized through an implementation of the disclosed technologies.

The above Summary presents a simplified summary in order to provide a basic understanding of some aspects of the vehicles, systems, and/or methods disclosed herein. This Summary is not an extensive overview of the vehicles, systems, and/or methods discussed herein. It is not intended to identify key/critical elements of the technologies described in greater detail below, nor is this Summary intended to delineate the scope of such vehicles, systems, and/or methods. Its sole purpose is to present some concepts in a simplified form as a prelude to the more detailed description that is presented later.

BRIEF DESCRIPTION OF THE DRAWINGS

The annexed drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Some embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows.

DETAILED DESCRIPTION

As mentioned, the disclosure recognizes and addresses, in at least some embodiments, the issue of noise reduction in the detection of electromagnetic (EM) signals in remote sensing systems that probe reflected EM radiation to detect objects within an environment. More specifically, yet not exclusively, the disclosure provides technologies that permit or otherwise facilitate reducing noise in the detection of reflected EM signals received at a remote sensing system.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, in some instances in this specification, the terms "component," "module," "unit," and "system" are intended to encompass computer-readable data storage, such as a memory device or another type of non-transitory storage medium, that is configured with computer-executable instructions that cause specific functionality to be performed in response to execution by a processor. The computer-executable instructions may include a routine, a function, or the like. A component and/or system may be localized on a single device or distributed across several devices. In other instances, the terms "component," "module," "unit," and "system" are intended to encompass an entity that includes hardware, software, or a combination of hardware and software. Such an entity can be embodied in or can include, for example, an apparatus with a defined functionality provided by optical parts, mechanical parts, and/or circuitry.

Figure 1:
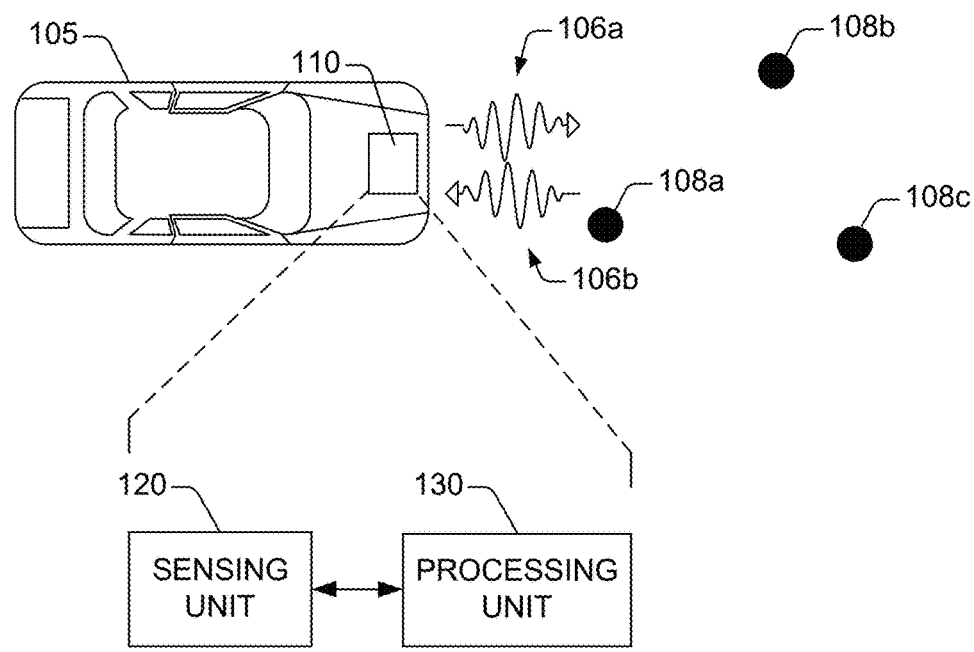
FIG. 1 illustrates an example of a vehicle in accordance with one or more embodiments of the disclosure.
Figure 1:
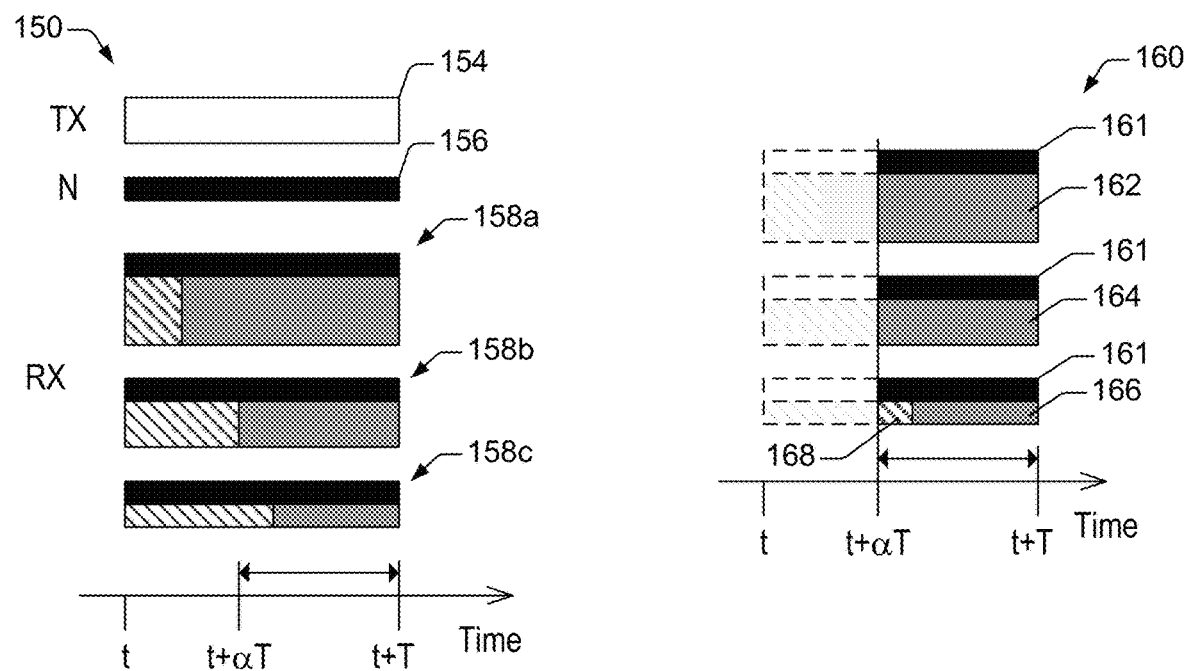

With reference to the drawings, FIG. 1 illustrates an example of a vehicle 105 that operates in accordance with aspects of the disclosure. The vehicle 105 is represent as an automobile simply for the sake of illustration and the disclosure is not limited in that respect. As mentioned, the principles and practical elements of this disclosure also can be applied to other types of vehicles. According to an example, the vehicle 105 can be an autonomous vehicle that operates without a human driver; however, the disclosure is not so limited. The vehicle 105 includes a sensing system 110 that probes EM radiation reflected from one or more objects within a region relative to the vehicle 105. The sensing system 110 can permit or otherwise facilitate reducing noise in the detection of EM signals representative of EM radiation received at the sensing system 110. Such EM radiation can be received in response to other EM radiation transmitted by the sensing system 110. More specifically, the sensing system 110 can include a sensing unit 120 that can emit EM radiation 106a of a defined type (e.g., radio frequency (RF) waves or light in the infrared portion of the EM spectrum). In some embodiments, the EM radiation 106a can include waves that have a defined type of wavefront. In other embodiments, the EM radiation 106a can be embodied in or can include laser beams that propagate in a defined direction in space. In those embodiments, the laser beams can be programmatically steered in mutually orthogonal planes in order to cover an area under detection. In some embodiments, the EM radiation 106 can be embodied in or can include FMCW waves or FMCW laser beams.

Figure 2A:
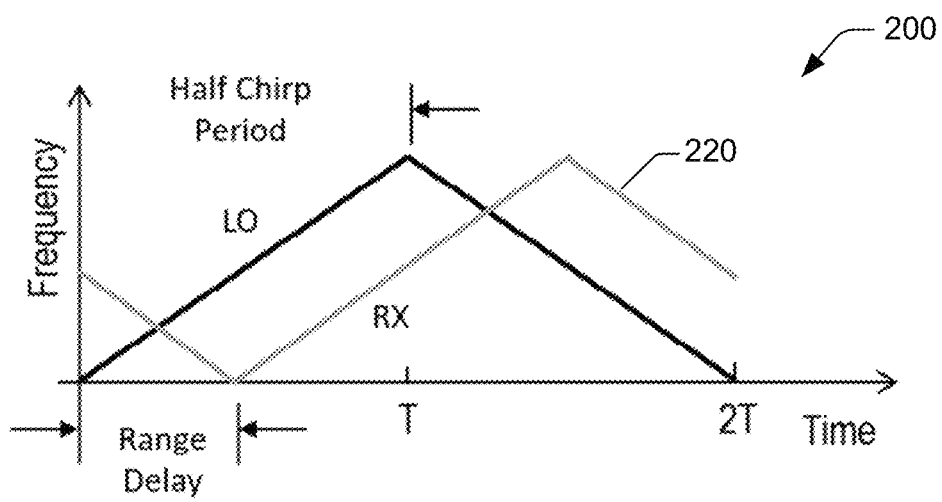
FIG. 2A illustrates examples of frequency modulation of emitted radiation and received radiation in a sensing system in accordance with one or more embodiments of the disclosure.

As is illustrated in diagram 150 in FIG. 1, the EM radiation 106 can be transmitted essentially continuously, as a periodic waveform having a defined period T (a real number in units of time). The periodic waveform during the defined period T is represented with a block 154. The defined time interval 2T can be referred to as the chirping period. In one or more embodiments, as is illustrated in FIG. 2A, the frequency modulation of the periodic waveform can be linear. The frequency of the periodic waveform increases linearly (up chirp) from a first value $f_1$ to a second value $f_2$ during the first half of the chirping period, and decreases linearly (down chirp) from $f_2$ to $f_1$ during the second half of the chirping period. FIG. 2A is illustrative of situations without Doppler shifts (e.g., objects are still) in detection, where frequencies in RX shifts are absent. The disclosure is not limited in that respect and embodiments of the disclosure also can be applied to situations that include moving objects; e.g., where Doppler shifts in RX are present.

With further reference to FIG. 1, at least a portion of the EM radiation 106a (e.g., laser beams) can scatter into objects or other types of structures in the region relative to the vehicle 105, thus causing, in some instances, return EM radiation 106b to be received at the sensing unit 120. The return EM radiation 106b can include EM radiation reflected from an object and noise. In embodiments in which the EM radiation 106a includes first laser beams, the EM radiation 106b can be embodied in or can include second laser beams resulting from reflection of at least a portion of the first laser beams. As is illustrated in FIG. 1, the objects can include, for example, a first object 108a, a second object 108b, and a third object 108c. The region can include a space within a defined distance from the vehicle 105. The space can be determined, for example, by a vantage point (or field of view) of a source device that generates the EM radiation 106a in the sensing unit 120. The source device can be embodied in or can include, for example, an RF signal generator or an infrared laser device based on the type of remote sensing implemented by the sensing system 110. In some embodiments, a laser beam can be steered into objects within such a space. The space also can be determined by meteorological conditions, such as a visibility conditions, in an environment in which the vehicle 105 operates. As such, in one example, the region can be proximate or otherwise neighboring to the vehicle 105, where the distance is of the order of tens of meters from the vehicle 105. In another example, the region can surround, at least partially, the vehicle 105.

Regardless of the region that is probed by the EM radiation 106a and the object or structure that reflects at least a portion of the EM radiation 106a, the sensing unit 120 can detect or otherwise process return EM radiation 106b during a portion of the defined period T of emission of the EM radiation 106. Specifically, as is illustrated in diagram 150, the sensing unit 120 can receive a periodic waveform indicative of the return EM radiation 106b during a terminal interval $(1-\alpha)T$, with $0<\alpha<1$, that spans a terminal portion of the defined period T.

By receiving such a periodic waveform during such a terminal interval relative to the defined period T, the sensing unit 120 can mitigate or otherwise avoid collecting signal during a range delay interval associated with a reflection of the EM radiation 106a by an object or structure located at a defined distance (or range) from the sensing system 110. Such a range delay interval corresponds to the time elapsed from the emission of EM radiation 106a and the reception, at the sensing system 110, of the reflection of the EM radiation 106a.

A trace 220 in FIG. 2A illustrates a time-dependent frequency modulation for a received periodic waveform, where a reflected FMCW waveform is received after a range delay interval, in response to a transmitted FMCW waveform. In addition, as is further illustrated in diagram 250 in FIG. 2B, a beat note (or CW frequency) is present after the range delay interval in response to mixing a transmitted FMCW waveform and the received FMCW waveform. Accordingly, by collecting signal representative of return EM radiation 106b during a terminal reception interval $(1-\alpha)T$, the sensing unit 120 can reduce the amount of collected signal that does not carry information on range and/or relative velocity of an object in the environment of the vehicle 105.

Further, by receiving the periodic waveform during the terminal reception interval $(1-\alpha)T$ relative to the defined period T, the sensing unit 120 can avoid collecting noise signal (labeled "N" and represented with a block 156 in FIG. 1) during the initial portion $\alpha T$ of the defined period T Noise signal can be present in the return EM radiation 106b. The noise signal can change as a function of time and can have multiple frequency components. By narrowing a reception interval from T to $(1-\alpha)T$, noise signal can be reduced proportionally to the reception interval width, e.g., $(1-\alpha)T$. Further, even with a narrowed reception interval, the sensing unit 120 can still collect signal representative of reflections from objects in the environment of the vehicle 105. Accordingly, signal-to-noise ratio (SNR) can be enhanced, particularly for long-distance objects, such as objects located at a distance that causes a range delay that is sizeable (e.g., ⅓ or ½) relative to the defined period T. Thus, in one aspect, the sensing system 110 provides improved SNR relative to commonplace remote sensing systems.

Diagram 150 in FIG. 1 also illustrates schematically reception (RX) of return signals, after transmission (TX), over the entire defined period T. Blocks 158a, 158b, and 158c represent reception return signals from the first object 108a, the second object 108b, and the third object 108c, respectively. The received signals include noise. The received signals also include FMCW waveform signals (represented with hatched block) and beat signals (also referred to as CW signals; represented with solid gray block). The more distant an object is relative to the vehicle 105, the larger amount of FMCW waveform signals are received due to greater range delay. The amplitudes of FMCW waveform signals (represented with hatched block) and amplitudes of beat signals decrease as the distance between the object and the vehicle 105 increases.

Figure 2B:
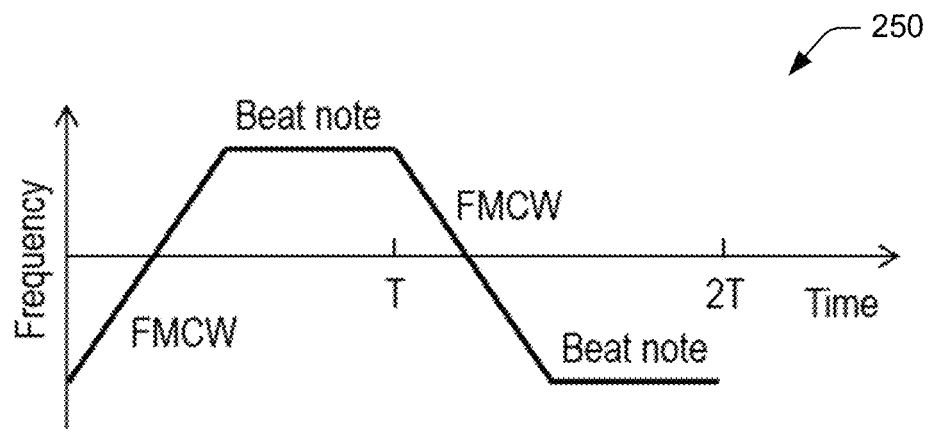
FIG. 2B illustrates an example of frequencies resulting from the mixing of a transmitted FMCW waveform and a received FMCW waveform in a sensing system in accordance with one or more embodiments of the disclosure.

In turn, diagram 160 in FIG. 1 depicts the foregoing principles of this disclosure in a scenario in which the return EM radiation 106b is reflected by the first object 108a, the second object 108b, and the third object 108c and mixed, by the sensing unit 120, with a transmitted FMCW waveform (see, e.g., FIG. 2B). The first object 108a can be located at a distance $d_1$ from the vehicle 105. In some situations, $d_1$ can be within a region that yields range delay less than about T/2. For the first object 108a, the signal received during the terminal reception interval $(1-\alpha)T$ includes noise 161 and beat signal 162. As discussed above, and illustrated in a dashed-line block, the amount of noise signal 161 is less than the amount of noise signal that would be otherwise collected during a reception interval corresponding to the entire defined period T.

As an illustration, in one example scenario, the first object 108a can be located at a distance $d_1$, from the sensing system 110, that yields a range delay of about T/4. For a terminal reception interval T/2 ($\alpha=0.5$), for such a distance $d_1$, the improvement in SNR relative to utilizing the entire defined period T for collection of signal is about 1.2 dB.

As is illustrated in FIG. 1, the second object 108b is located farther from the vehicle 105 than the first object 108a, at a distance $d_2>d_1$. In some situations, $d_2$ can be in a region that yields a range delay of about T/2. Regardless the particular magnitude of $d_2$, for the second object 108b, the received power of the received return EM radiation 106b is less than the received power of received return EM radiation 106b from the first object 108a. Accordingly, the beat signal 164 received during the terminal reception interval $(1-\alpha)T$ is represented with a smaller block than the block corresponding to signal 162. As is illustrated, received FMCW waveform signal is not present during such reception interval for the second object 108b. Noise signal 161 is present regardless of the relative distance between the vehicle 105 and the second object 108b. Yet, by curtailing the collection of noise signal 161 (see dashed-line block) the sensing unit 120 can provide a suitable SNR for detection and processing of beat signals 164.

As an illustration, in one example scenario, the second object 108b can be located at a distance $d_2$ that yields a range delay of about T/2. For a terminal reception interval T/2 (where $\alpha=0.5$), for such a distance $d_2$, the improvement in SNR relative to utilizing the entire defined period T for collection of signal is about 3 dB.

As is also illustrated in FIG. 1, the third object 108c is located farther from the vehicle 105 than both the first object 108a and the second object 108b, at a distance $d_3>d_2>d_1$. As such, the received power of the received return EM radiation 106b is less than the received power of received return EM radiation 106b from the second object 108b. In addition, the signal collected by the sensing unit 120 during the terminal reception interval $(1-\alpha)T$ is illustrated as having signals 168 from received FMCW waveform and beat signals 166. As mentioned, as the distance between an object that reflects EM radiation 106a and the sensing system 110 increase, the amplitude of signal representative of return EM radiation 106b decreases and beat signals occupy a smaller portion of the terminal reception interval $(1-\alpha)T$. Yet, as mentioned, by curtailing the collection of noise signal 161 (see dashed-line block) the sensing unit 120 can provide a suitable SNR for detection and processing of the beat signals 166.

As an illustration, in one example scenario, the third object 108c can be located at a distance $d_3$ that yields a range delay of about (⅝)T. For a terminal reception interval T/2 ($\alpha=0.5$), for such a distance $d_3$, the improvement in SNR relative to utilizing the entire defined period T for collection of signals is about 3 dB. A greater improvement is obtained for a terminal reception interval (⅝)T (where $\alpha=0.375$), the SNR improvement is about 4.3 dB. Accordingly, this example scenario illustrates that flexibility in the adjustment of terminal reception interval can permit achieving an optimized or otherwise desired level of SNR improvement for certain distances.

The sensing system 110 also can include a processing unit 130 that can generate or otherwise receive data representative of signal received during one or more terminal reception intervals as is described in this disclosure. The processing unit 130 can process or otherwise operate on such data in order to generate, for example, a range-doppler map of a region relative to the vehicle 105. In some embodiments, the processing unit 130 can include, for example, processing circuitry or other types of computing processing units (such as CPUs, GPUs, or a combination of both). The processing unit 130 also can include memory device(s) or other types of storage circuitry. Therefore, in some embodiments, the processing unit 130 can refer to a single-core processor; a single processor with software multithread execution capability; a multi-core processor; a multi-core processor with software multithread execution capability; a multi-core processor with hardware multithread technology; or the like.

Figure 2C:
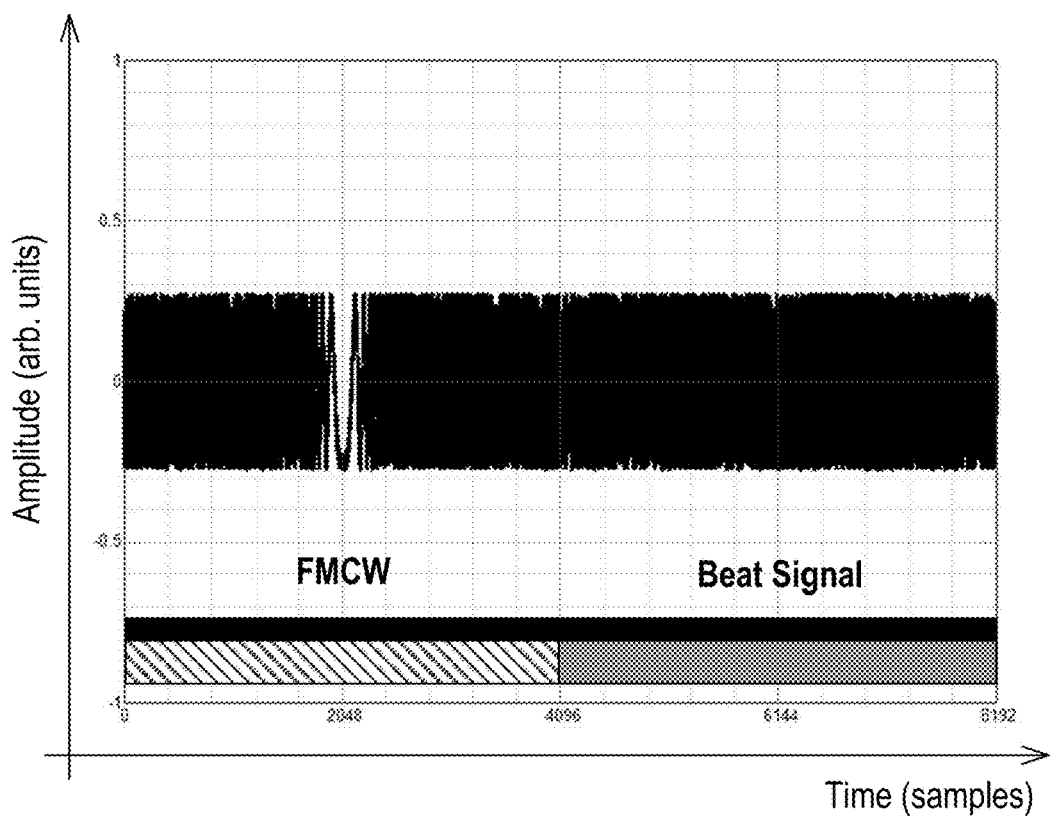
FIG. 2C illustrates an example of signal collected by a sensing system in accordance with one or more embodiments of the disclosure.
Figure 2D:
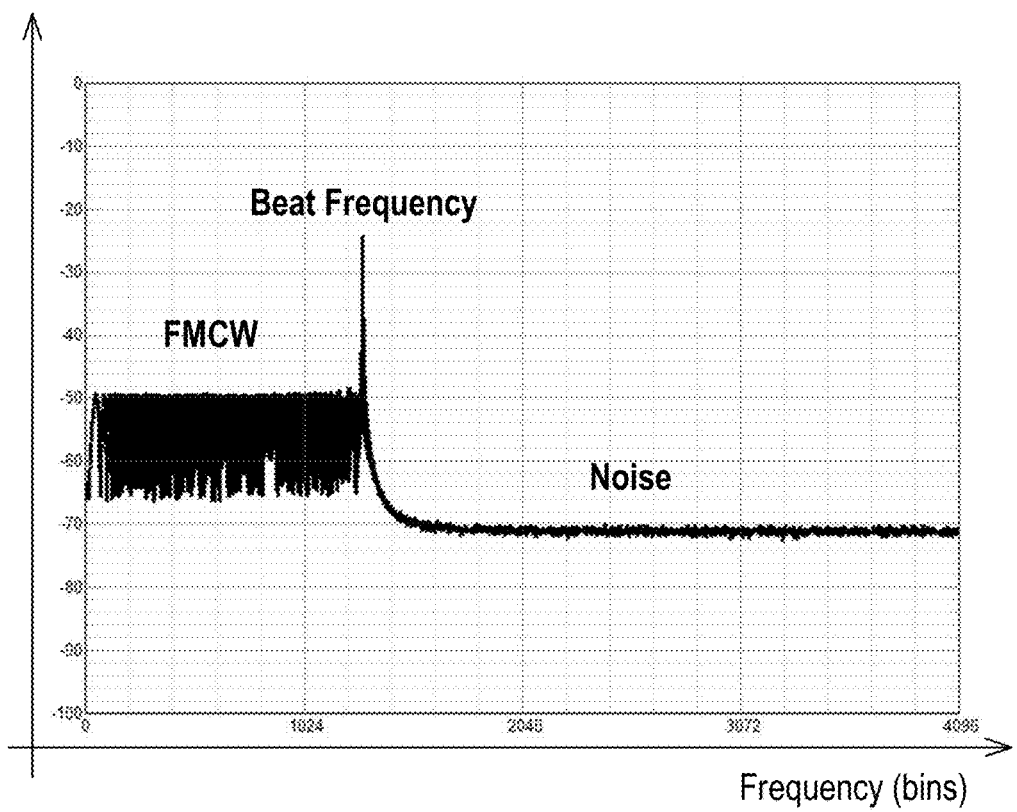
FIG. 2D illustrates an example of results of applying an FFT operation to the signal shown in FIG. 2C.
Figure 2E:
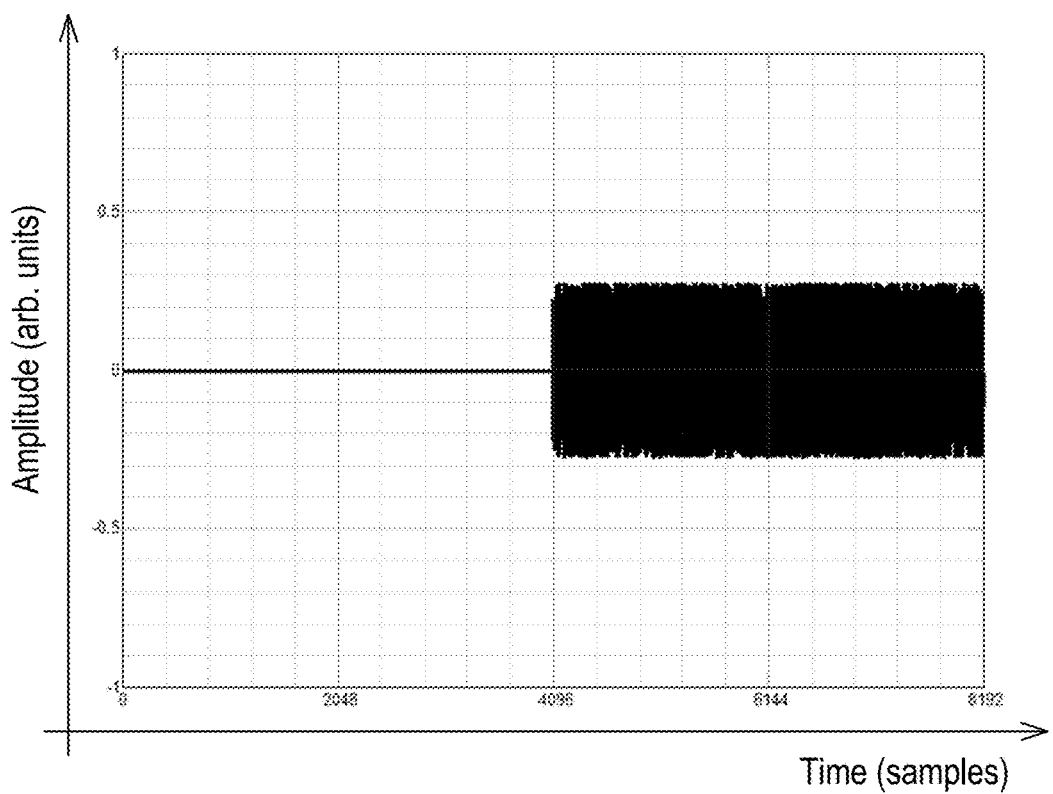
FIG. 2E illustrates an example of other signal collected by a sensing system in accordance with one or more embodiments of the disclosure.
Figure 2F:
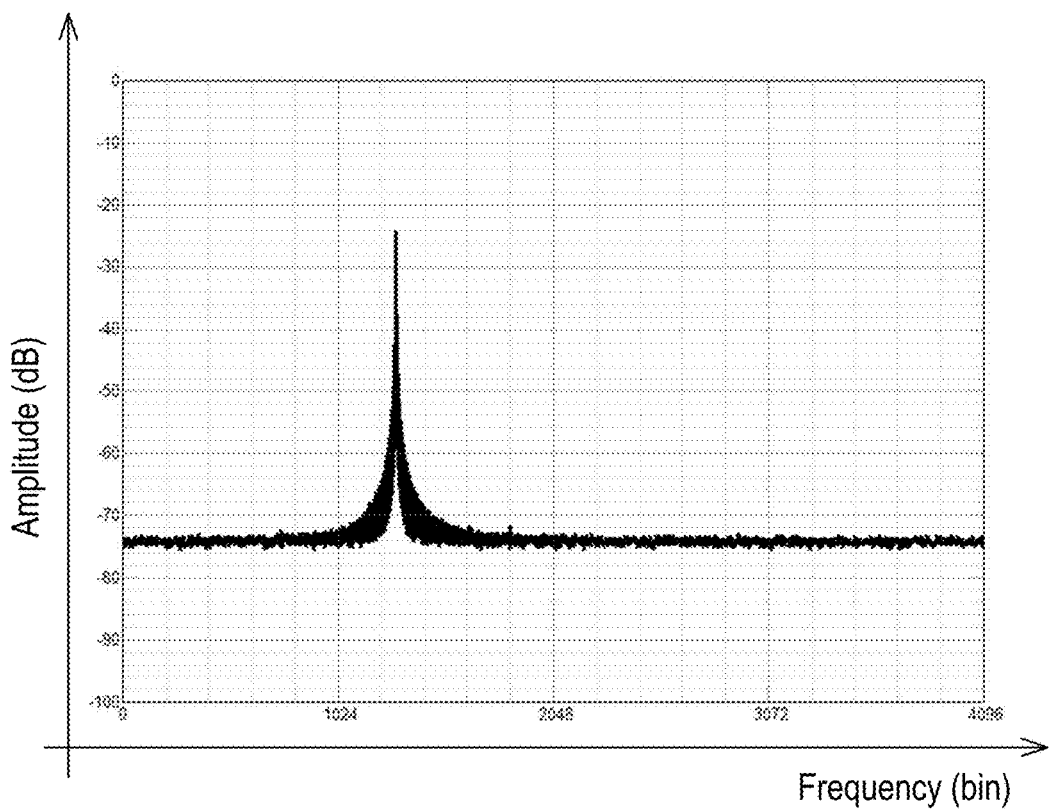
FIG. 2F illustrates an example of results of applying an FFT operation to the signal shown in FIG. 2E.

Processing or otherwise operating on such data can include applying one or more fast Fourier transform (FFT) operations to the data. As an illustration, FIG. 2C presents an example of signal collected by the sensing unit 120 during a reception interval (e.g. T). As discussed herein, the collected signal can include received FMCW waveform signal and beat signal, where the beat signal occupies a latter portion of the reception interval. Upon or after digitization of the collected signal, the processing unit 130 can implement an FFT operation on data indicative of the collected signal. As is illustrated in FIG. 2D, the FFT operation can yield a narrow response corresponding to one or more beat frequencies present in the beat signal, a baseline of frequencies corresponding to modulation frequencies of the FMCW, and a noise baseline. As a comparison, FIG. 2E illustrates an example of signal collected by the sensing unit 120 during the terminal half of the reception interval (e.g., T/2). FIG. 2F illustrates an example of results of applying an FFT operation to the signal shown in FIG. 2E. Again, the FFT operation can yield a narrow response corresponding to one or more beat frequencies present in the beat signal and a noise baseline at higher frequencies.

Figure 2G:
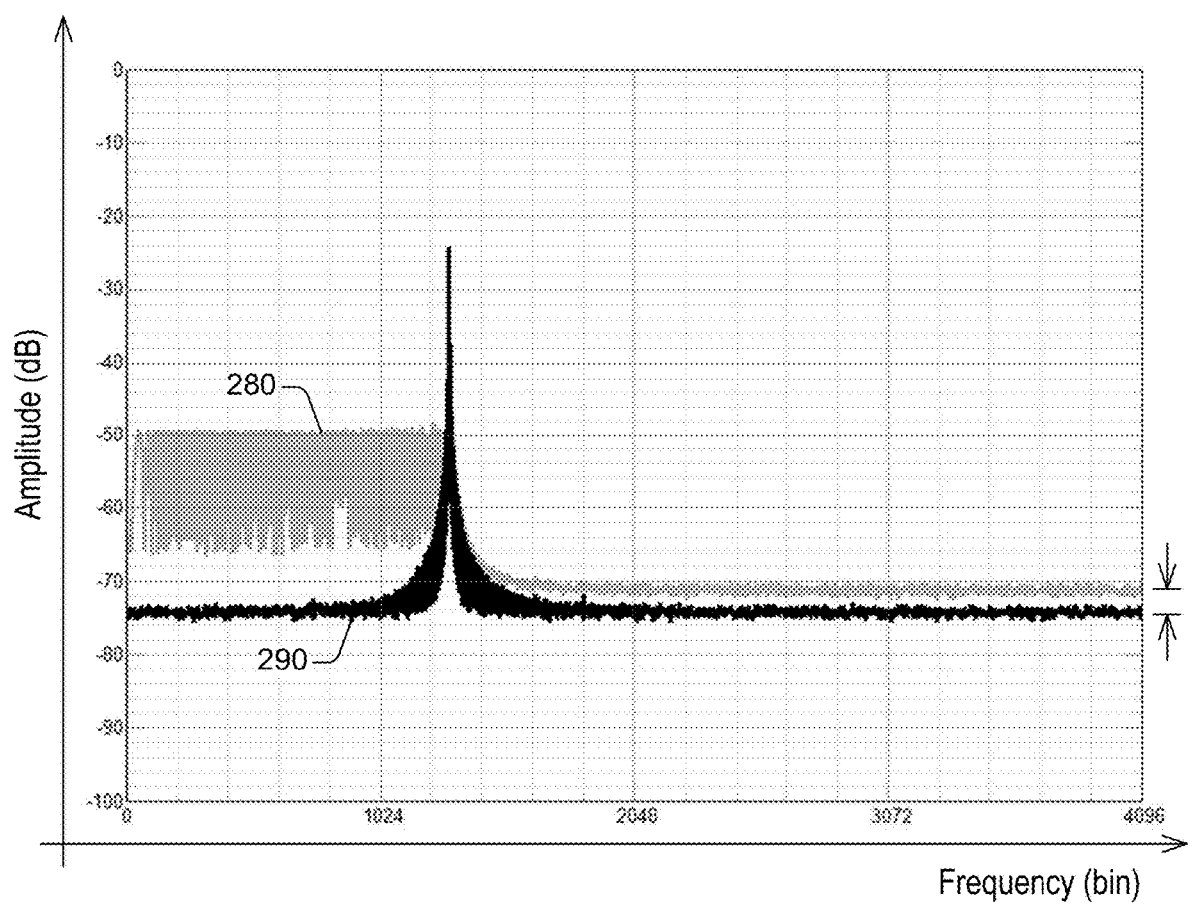
FIG. 2G illustrates a comparison between the FFT results shown in FIG. 2D and FIG. 2F.

FIG. 2G illustrates the noise reduction that can be achieved by utilizing the terminal half of the reception interval (referred to as half-windowing reception). In FIG. 2G, the trace 280 corresponds to the FFT results shown in FIG. 2D and the trace 290 corresponds to the results shown in FIG. 2F. The amount of noise reduction that is achieved is about 4 dB; see arrows in FIG. 2G.

Figure 3A:
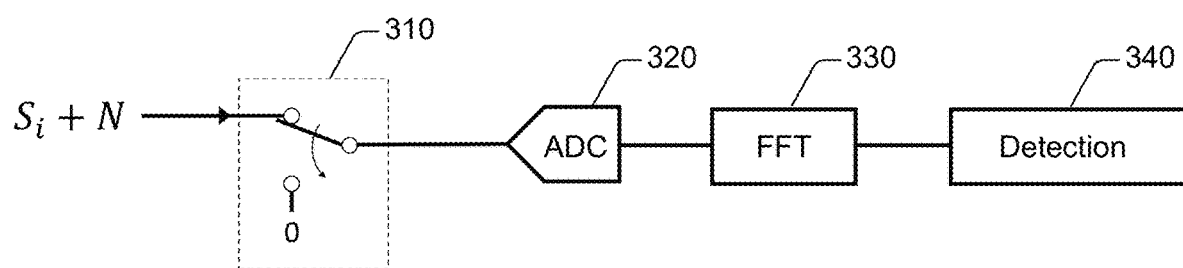
FIG. 3A schematically depicts an analog processing approach to noise reduction in the detection of electromagnetic (EM) signals, in accordance with one or more embodiments of the disclosure.

Two types of approaches can be adopted to implement the detection of EM signals in accordance with this disclosure: an analog approach and digital approach. The analog approach is schematically depicted in FIG. 3A. In this approach, an analog filtering unit 310 can filter received signal Si and noise N to produce filtered signal within the terminal interval of the reception period T. The filtered signal can be digitized, using an analog-to-digital converter (ADC) device 320. Digital data representative of the filtered signal can be processed at an FFT block 330. The FFT transformed data can be processed at a detection block 340 to determine a range-Doppler map, for example.

Figure 3B:
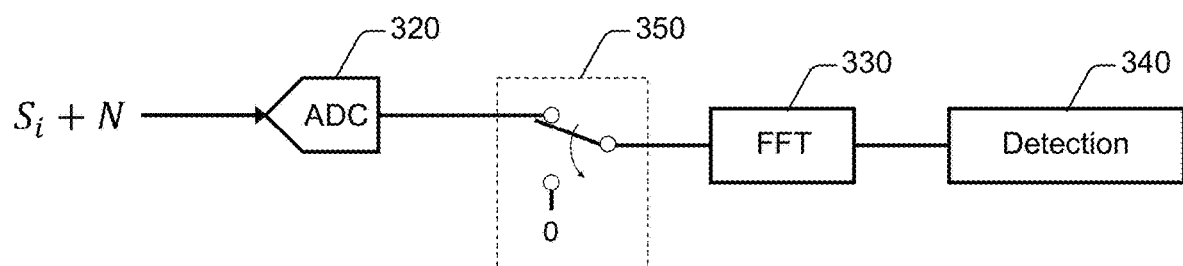
FIG. 3B schematically depicts a digital processing approach to noise reduction in the detection of EM signals in accordance with one or more embodiments of the disclosure.

FIG. 3B schematically depicts the digital approach. In this approach, a digital filtering unit 350 can remove a portion of the digital data generated by the ADC device 320. The portion that is removed correspond to a leading time interval of the reception period T. Thus, only digital data in a terminal interval of the reception period T can be available for subsequent processing.

Figure 4A:
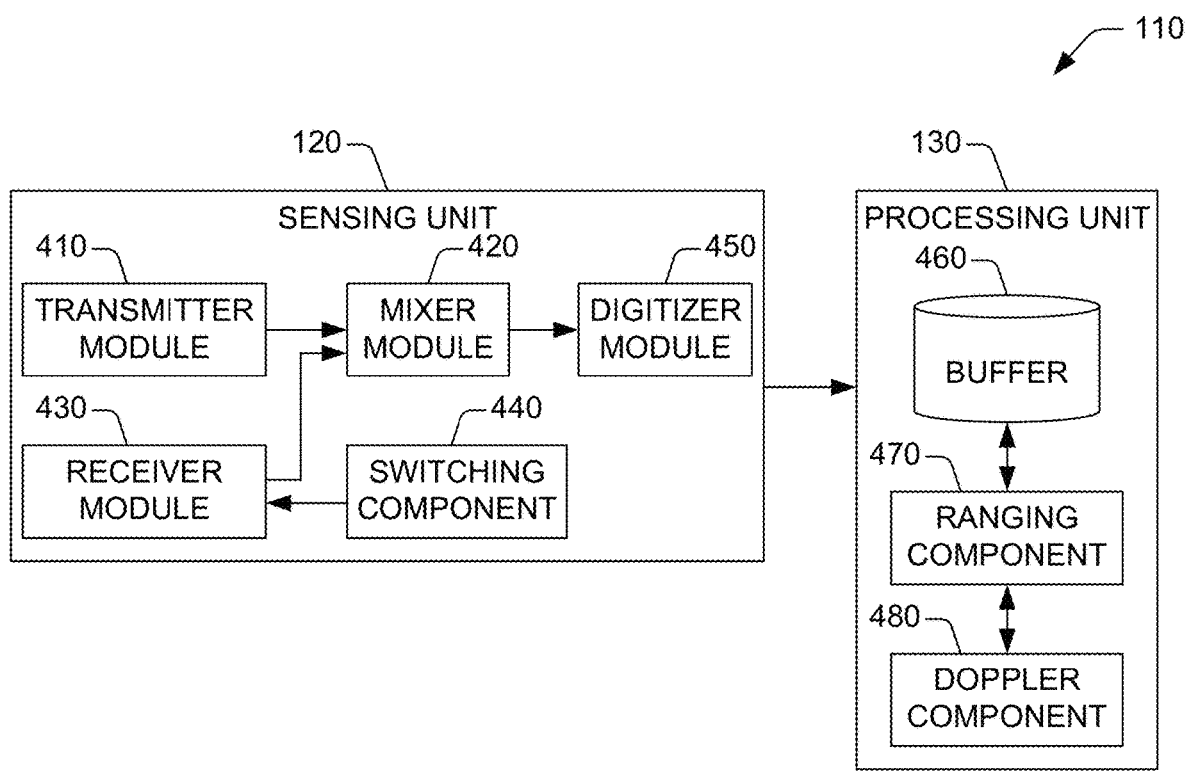
FIG. 4A illustrates an example of a sensing system for noise reduction in the detection of EM signals, in accordance with one or more embodiments of the disclosure.

FIG. 4A illustrates an example of the sensing system 110 in accordance with one or more embodiments of the disclosure. As discussed herein, the sensing system 110 can permit or otherwise facilitate noise reduction in the detection of reflected EM signals utilized to determine the presence of objects in a region relative to the sensing system 110. The sensing system 110 includes a sensing unit 120 that can emit EM radiation of a defined type (e.g., EM radiation 106a, FIG. 1). To that end, the sensing unit 120 can include a transmitter module 410 that can generate and emit the EM radiation. In some embodiments, the sensing unit 120 can constitute a lidar system and the transmitter module 410 can include a light source device (e.g., a laser device) that generates light of a defined wavelength (e.g., one or multiple laser beams) and a modulator device that can modulate the frequency of the generated light in order to generate FMCW electromagnetic waves. Such waves embody or otherwise constitute the EM radiation emitted by the transmitter module 410. In other embodiments, the sensing unit 120 can constitute a radar system and the transmitter module 410 can include one or more antennas and a generator that produces an alternating electric signal that causes each one (or, in some embodiments, at least one) of the antennas to emit the EM radiation. In addition, the transmitter module also can include a modulator device that can modulate the frequency of the alternating electric signal in order to modulate the frequency of the EM radiation that is emitted by the transmitter module 410—for example, to emit FMCW electromagnetic waves. Regardless the type of FMCW electromagnetic waves that are generated and/or emitted, a waveform of the FMCW electromagnetic waves can be periodic with a defined period T (see FIG. 1).

The transmitter module 410 also can send at least a portion of a generated FMCW electromagnetic wave to a mixer module 420 to be used as a reference signal in the mixing with received reflected EM radiation (e.g., return EM radiation 106b, FIG. 1).

The sensing unit 120 also can include a receiver module 330 that can receive the reflected EM radiation. Rather than operating at essentially 100% duty cycle and receiving the reflected EM radiation during the entirety of the defined period T, the sensing unit 120 can include a switching component 440 that can cause (e.g., configure or otherwise direct) the receiver module 430 to operate in a terminal interval of the defined period T. As mentioned, the terminal interval can span an interval $(1-\alpha)T$, beginning at an instant $t_0+\alpha T$ before T and ending at another instant equal to $t_0+T$, where $t_0$ corresponds to the instant at which the transmission period begins. In some embodiments, the switching component 440 can include a clocking device that can send a clock signal to the receiver module 420 in order to cause the receiver module 420 to commence receiving reflected EM radiation (e.g., reflected laser beams) at the beginning of the terminal interval and to end receiving radiation at $t_0+T$, the end of the terminal interval. For instance, the clock signal can trigger the receiver module to transition from an OFF-state to an energized state at substantially $t_0+\alpha T$ and remain energized for a defined number of counts, transitioning back to the OFF-state at substantially $t_0+T$.

The receiver module 430 can guide (via an optic fiber or another type of waveguide, for example) the reflected EM radiation received during the terminal interval $(1-\alpha)T$ to the mixer module 420 for the received reflected EM radiation to be mixed with the reference signal supplied by the transmitter module 410.

In an embodiment in which the sensing unit 120 constitute a lidar system, the mixer module 420 can include one or more photodetector devices that can generate an analog signal, e.g., a voltage or a current, representative of a mixed signal resulting from the mixing of the FMCW electromagnetic wave generated by the transmitter module and the reflected EM radiation received by the receiver module 420. As discussed herein, the mixed signal can present an improved SNR relative to commonplace systems that receive reflected EM radiation during the transmission period T. In some embodiments, the sensing unit 120 can include a digitizer module 450 that can generate data representative of the mixed signal. The digitizer module 450 can include an analog-to-digital converter (ADC) component.

Figure 4B:
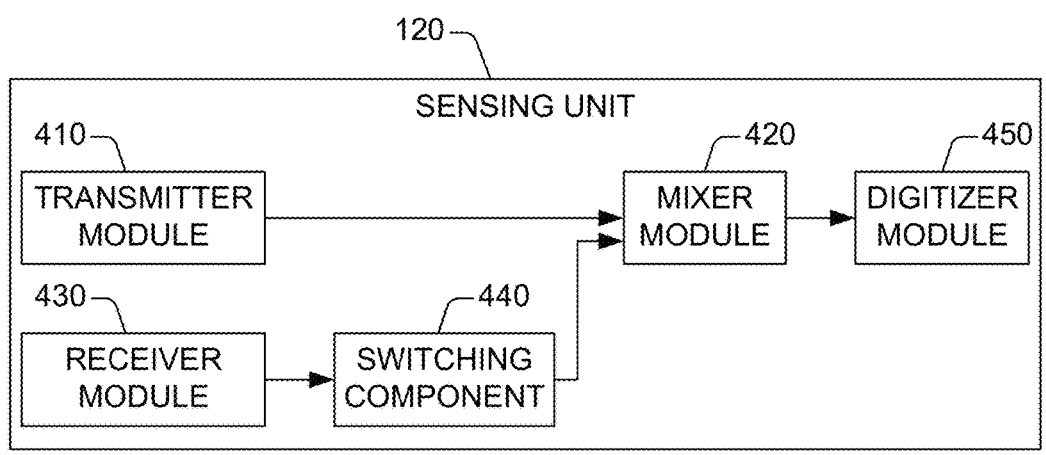
FIGS. 4B-4E illustrate respective examples of a sensing unit for noise reduction in the detection of EM signals, in accordance with one or more embodiments of the disclosure.
Figure 4C:
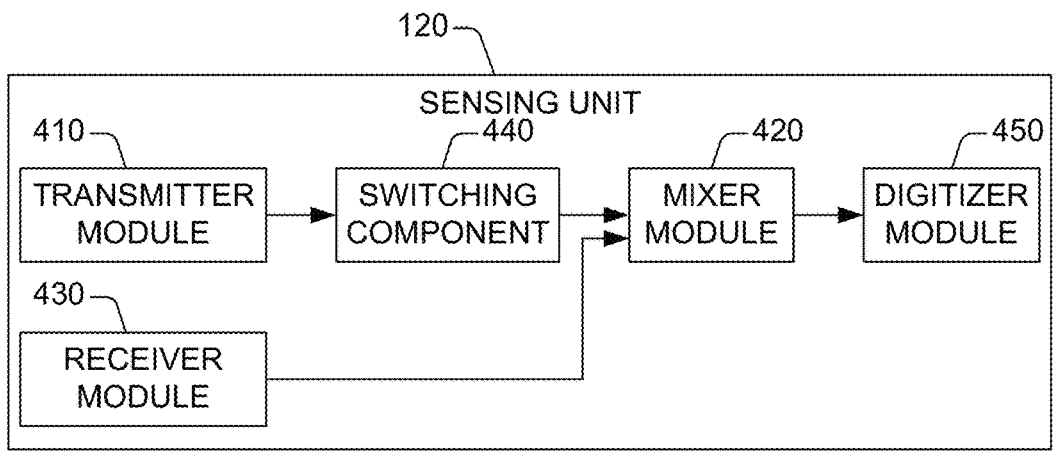

In some embodiments, as is shown in FIG. 4B, rather than adjusting the duty cycle of the receiver module 430, the switching component 440 can filter the output of the receiver module 430 in order to supply signal in the terminal interval $(1-\alpha)T$ to the mixer module 420. To that end, the switching component 440 can be functionally coupled to the mixer module 420 and the digitizer module 450.

Figure 4D:
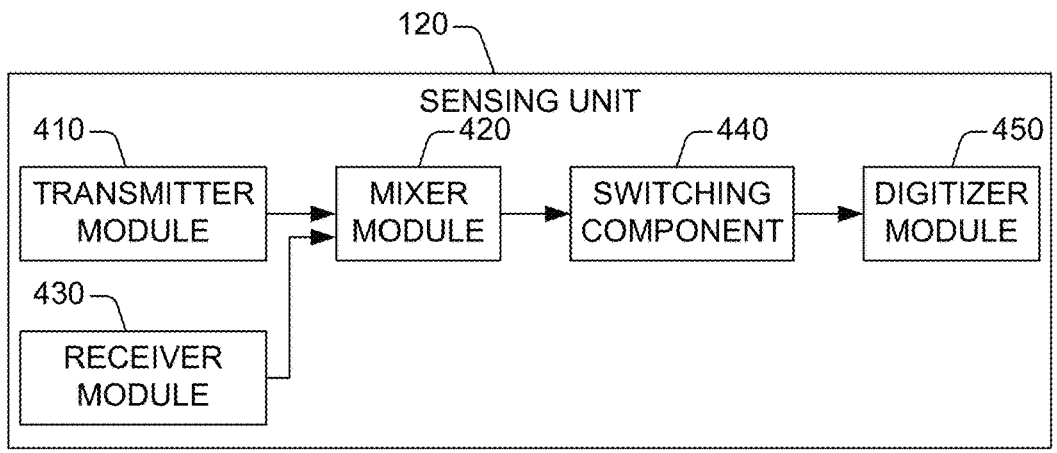
Figure 4E:
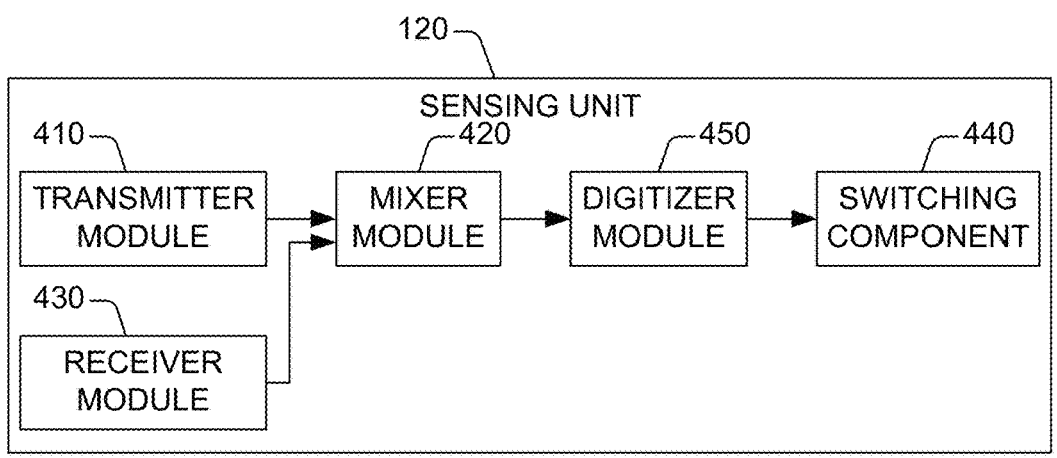

Other configurations of the switching component 440 are contemplated. In one embodiment, as is illustrated in FIG. 4D, the switching component 440 can filter the output from the mixer module 420 in order to supply signal in the terminal interval $(1-\alpha)T$ to the digitizer module 450. To end, the switching component 440 can be functionally coupled to mixer module 420 and the digitizer module 450. In another embodiment, as is shown in FIG. 4E, the switching component 440 can filter the output of the digitizer module 450 to supply digital data corresponding to mixed signal in the terminal interval $(1-\alpha)T$. The digital data can be supplied to the processing unit 130 or another type of processing circuitry for further processing.

In other embodiments, as is shown in FIG. 4D, rather than adjusting the duty cycle of the receiver module 430, the switching component 440 can filter the output of the mixer module 420 in order to supply signal in the terminal interval $(1-\alpha)T$ to the digitizer module 450. To that end, while not illustrated, the switching component 440 can be functionally coupled to the mixer module 320 and the digitizer module 450.

A processing unit 130 functionally coupled to the sensing unit 120 can receive at least a portion of the data representative of the mixed signal and can retain the received data in one or more memory devices 460 (generically referred to as buffer 460). As mentioned, the processing unit 130 can process or otherwise operate on the data retained in the buffer 460. To that end, the processing unit include processing circuitry that can implement one or more operations, such as FFT operations, on the data. In some embodiments, as is illustrated in FIG. 4, the processing circuitry can include a ranging component 470 and a Doppler component 480 that can generate a range-doppler map by processing at least the data in the buffer 460.

Figure 5:
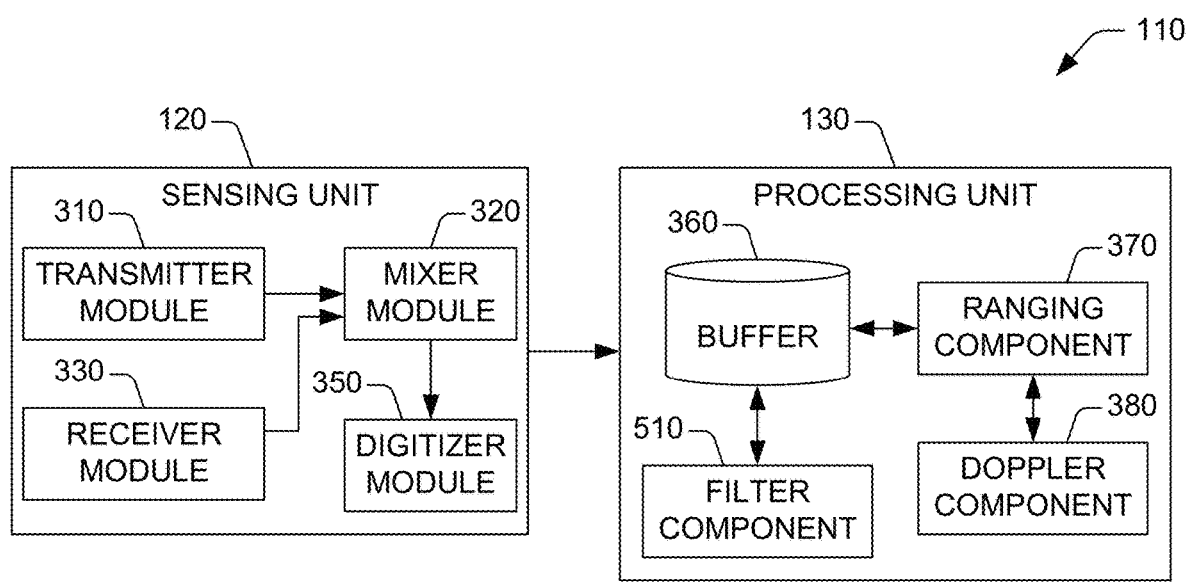
FIG. 5 illustrates another example of a sensing system for noise reduction in the detection of EM signals, in accordance with one or more embodiments of the disclosure.

In some embodiments, the sensing system 110 need not rely on triggering the receiver module 430 to receive reflected EM radiation during the terminal reception interval (1−α)T. Instead, the sensing unit 120 can generate a mixed signal based on reflected EM radiation that is received during the entire period T by the receiver module 420. The sensing unit 120 can send data representative of such a mixed signal to the processing unit 130 that, in response, can process or otherwise operate on a portion of the data corresponding to the terminal reception interval (1−α)T. FIG. 5 illustrates an example of the sensing system 110 that, in one or more embodiments, can operate in such a fashion.

More specifically, as is illustrated in FIG. 5, the sensing unit 120 can send, via the digitizer module 450, for example, the data representative of a mixed signal based on reflected EM radiation that is received during the entire period T. As such, the data can represent signal that includes FMCW signal and beat signal (see, e.g., FIG. 2C) across the entire defined period T. The processing unit 130 can receive and retain the data in the buffer 460. In addition, the processing unit 130 can include a filter component 510 that can remove a portion of the data, where the portion of the data represents signal corresponds to an initial interval αT prior to the terminal interval (1−α)T. Thus, the filter component 510 can condition the data retained in the buffer 460 to enhance SNR in accordance with aspects described herein. The second data after the removal of the portion of data be processed by or otherwise operated on the ranging component 470 and/or the Doppler component 480.

The filter component 510 need not be separate from the ranging component 470 and the Doppler component 480. In some embodiments, the ranging component 470 and/or the Doppler component 480 can include the filter component 510. Thus, the ranging component 470 or the Doppler component 480 that includes the filter component 510 can filter data as described herein, prior to operating on the data.

Figure 6:
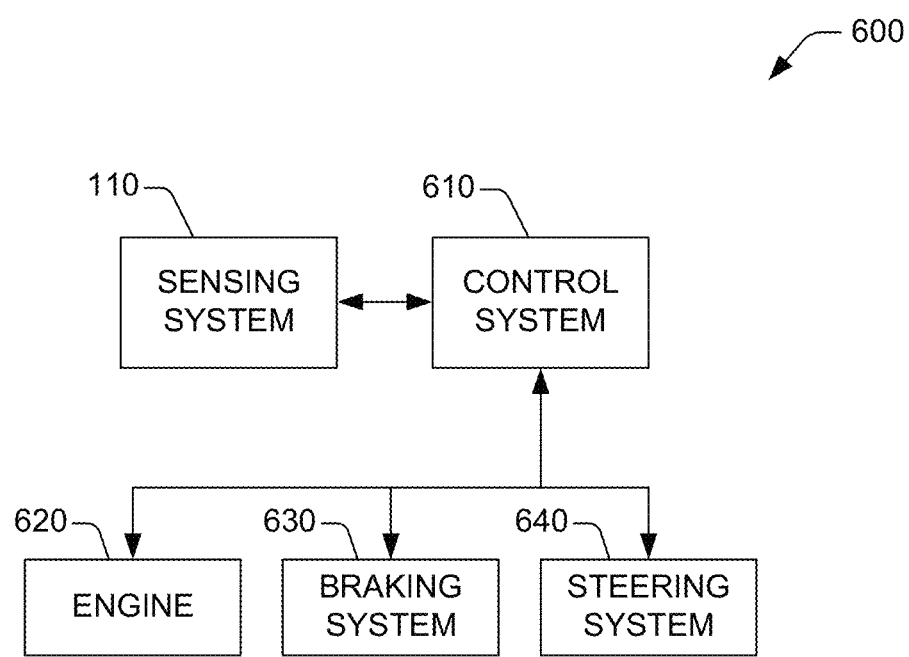
FIG. 6 illustrates an example of a control platform in accordance with one or more embodiments of the disclosure.

Regardless of specific architecture, the results of processing or otherwise operating on data received and/or conditioned by processing unit 130 can be utilized to control and/or augment an operation of the vehicle 105. FIG. 6 illustrates an example of an operational environment 600 for adjusting operation of the vehicle 105 using at least data that present enhanced SNR in accordance with aspects of this disclosure. As is illustrated, the operational environment 600 includes a sensing unit 120 in accordance with one or more embodiments described herein. The sensing unit 120 can be functionally coupled to a control system 610 that can utilize at least results of processing data representative of signal indicative of reflected EM radiation received at the sensing unit 120 to implement a control process to control and/or augment an operation of a vehicle (e.g., vehicle 105, FIG. 1). For instance, as mentioned, the sensing system 110 can generate a range-doppler map based at least on such data. The control system 610 can utilize the range-doppler map to control and/or augment an operation of the vehicle (autonomous or otherwise). To that end, in some aspects, the control system 610 can be functionally coupled to and cause control the operation of an engine 620, a braking system 630, a steering system 640, other mechanical systems, and/or other electromechanical systems of the vehicle.

Figure 7:
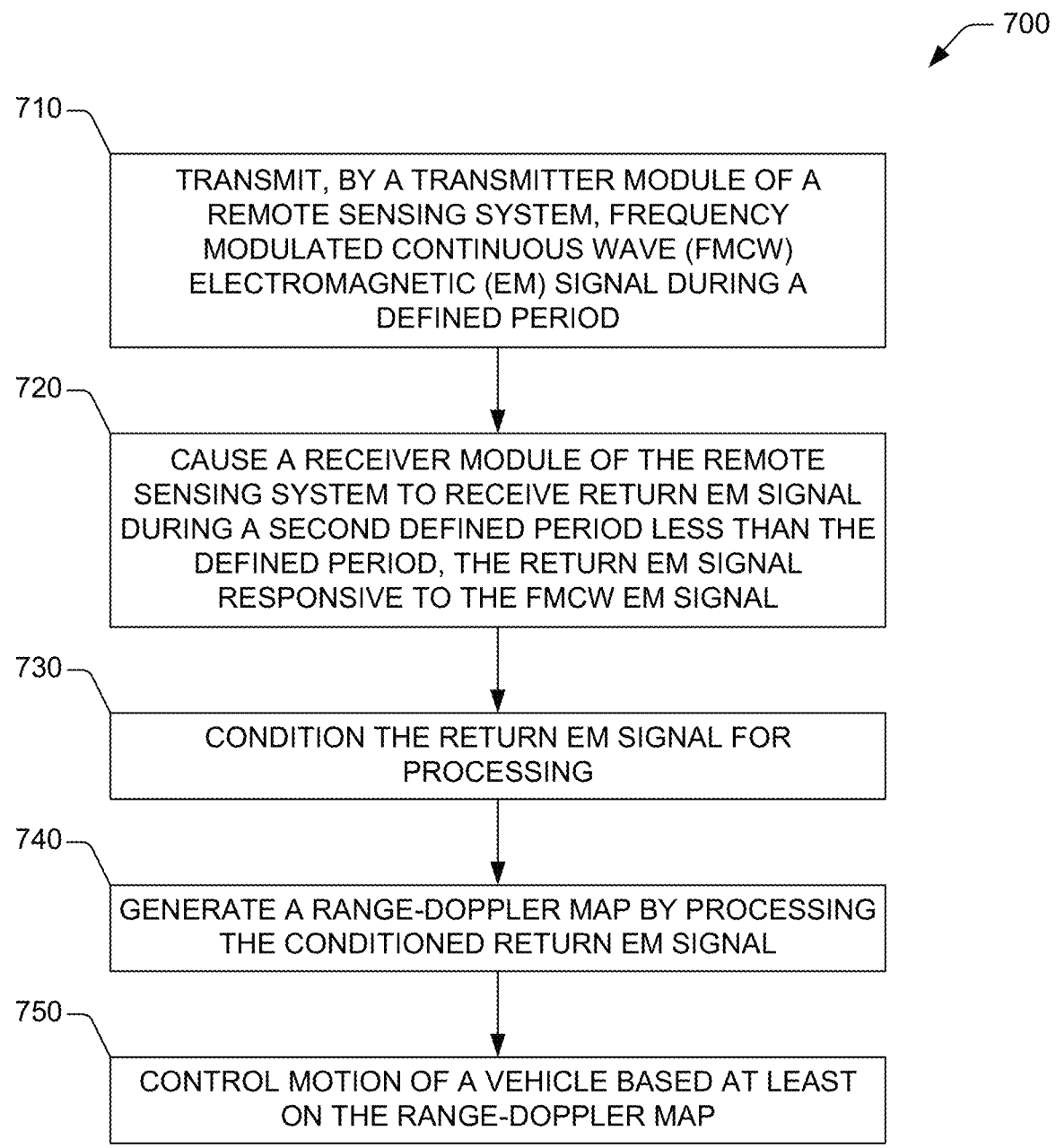
FIGS. 7-8 illustrates example of methods for reducing noise in the detection of reflected EM radiation and controlling a vehicle based at least on the noise-reduced detection, in accordance with one or more embodiment of the disclosure.
Figure 8:
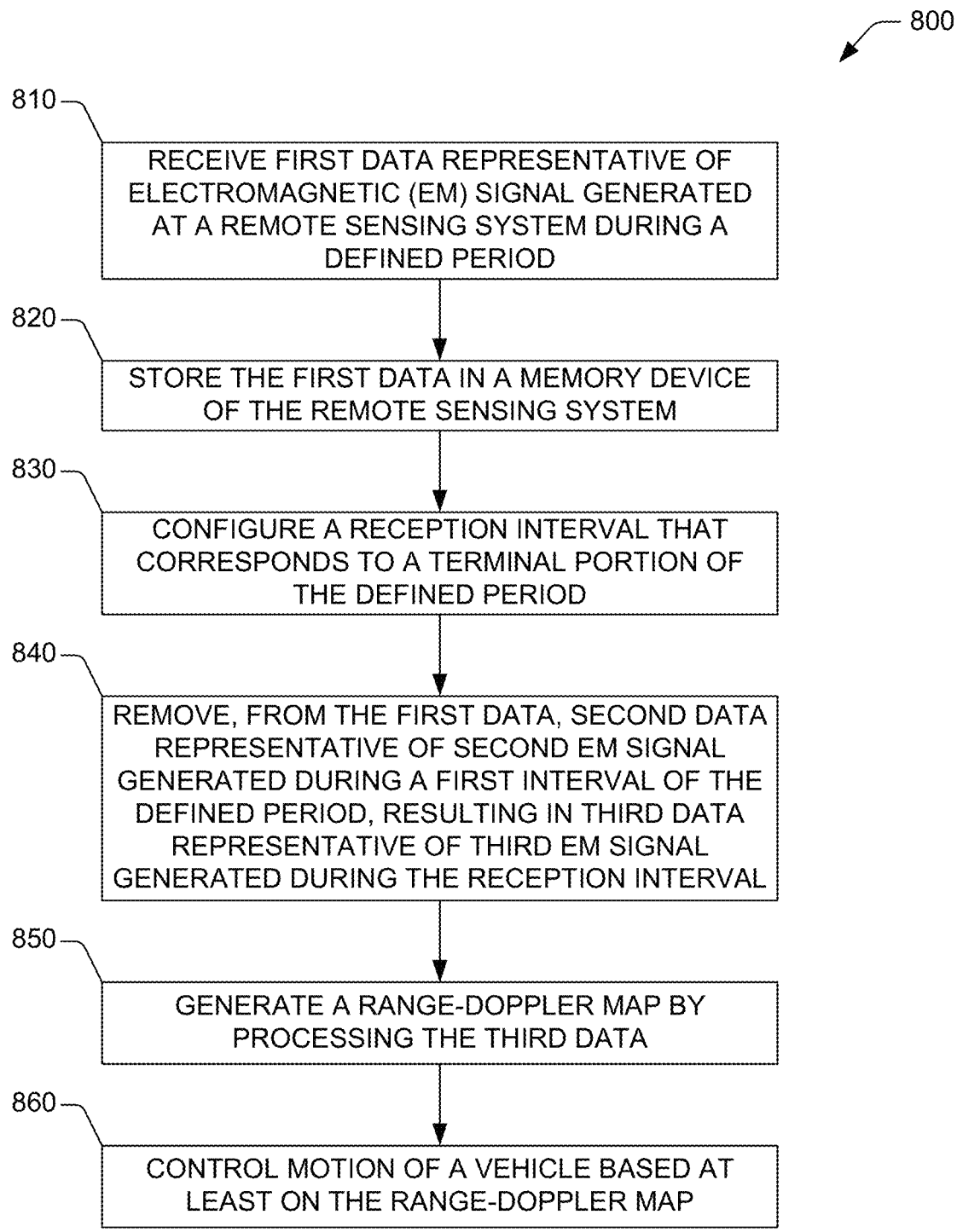

FIG. 7 and FIG. 8 illustrate examples of methods that emerge from the principles of this disclosure. While the exemplified methods are presented and described as a series of acts or operations that are performed in a sequence, the disclosure is not limited in that respect. Indeed, any one of the methods disclosed herein is not limited by the order (explicit or implied) of a specific sequence of acts or operations. For example, some acts or operations can occur in a different order than what is illustrated herein. In addition, an act or operation can occur concurrently with another act or operation. Further, in some instances, not all acts or operations may be required to implement a method or group of methods disclosed herein.

In some embodiments, the acts or operations disclosed in connection with any of the methods in accordance with this disclosure may be machine-accessible instructions (e.g., computer-readable and/or computer-executable instructions) that can be executed or otherwise implemented by one or more processors and/or can be stored on a computer-readable medium or media. The machine-accessible instructions can include a routine, a sub-routine, programs, a thread of execution, and/or the like. Results of acts or operations of the methodologies can be stored in a computer-readable medium, displayed on a display device, and/or the like.

The example methods illustrated in FIGS. 7-8, and in some instances, combinations of such methods, can be performed by a vehicle (autonomous or otherwise) having remote sensing systems in accordance with embodiments of this disclosure. For instance, the vehicle 105 illustrated in FIG. 1 can implement, by means of the sensing system 110, one or a combination of the example methods illustrated in FIGS. 8-8.

Specifically, FIG. 7 illustrates an example method 700 for reducing noise in the detection of reflected EM radiation and controlling a vehicle (autonomous or otherwise) based at least on the noise-reduced detection, in accordance with one or more embodiment of the disclosure. As mentioned, the example method 700 can be performed by the vehicle, in accordance with embodiments of this disclosure. For instance, the vehicle 105 illustrated in FIG. 1 can implement the example method 700.

At block 710, a transmitter module of a remote sensing system can transmit FMCW electromagnetic signal during a defined period (e.g., the defined period T). The FMCW electromagnetic signal can be modulated according to a defined waveform, including a sawtooth waveform, a triangular waveform, and the like. In some embodiments, the remote sensing system can be embodied in or can include the sensing system 120 and the transmitter module can be embodied in or can include the transmitter module 410.

At block 720, a switching component of the remote sensing system can cause a receiver module of the remote sensing system to receive return EM signal during a second defined period less than the defined period. The second defined period can correspond to a terminal interval of the defined period, e.g., the second defined period can be substantially equal to the terminal interval (1−α)T and the defined period can be substantially equal to T.

At block 730, the remote sensing system (e.g., sensing system 120) can condition the return EM signal for processing. For example, a module (e.g., mixer module 420) included in the remote sensing system can mix the return EM signal with the FMCW electromagnetic signal transmitted at block 710. In addition, or in some embodiments, another module (e.g., the digitizer module 450) included in the remote sensing system can digitize the resulting mixed signal.

At block 740, a processing unit of the remote sensing system can generate a range-Doppler map by processing or otherwise operating on the conditioned return EM signal. In one aspect, processing the conditioned return EM signal can include performing an FFT operation on the conditioned return EM signal. At block 750, a control system functionally coupled to the processing unit can control motion of the vehicle (e.g., the vehicle 105) based at least on the range-Doppler map. While not shown in FIG. 7, in additional or alternative embodiments, the control system can augment an operation of the vehicle based at least on the range-Doppler map. The control system can be embodied in or can include, for example, the control system 610.

FIG. 8 illustrates an example method 800 for reducing noise in the detection of reflected EM radiation and controlling a vehicle (autonomous or otherwise) based at least on the noise-reduced detection, in accordance with one or more embodiment of the disclosure. As mentioned, the example method 800 can be performed by the vehicle, in accordance with embodiments of this disclosure. For instance, the vehicle 105 illustrated in FIG. 1 can implement the example method 800 by means of a processing unit included in the vehicle 105. The processing unit can include, for example, processing circuitry or other types of computing processing units (such as CPUs, GPUs, or a combination of both). Therefore, for the sake of illustration, the processing unit can refer to a single-core processor; a single processor with software multithread execution capability; a multi-core processor; a multi-core processor with software multithread execution capability; a multi-core processor with hardware multithread technology; or the like.

At block 810, the processing unit can receive first data representative of electromagnetic signal generated at a remote sensing system during a defined period (e.g., the defined period T). The electromagnetic signal can be generated, for example, by a mixer module of the remote sensing system and includes a beat signal (see, e.g., FIG. 1 and FIG. 2B). In some embodiments, the remote sensing system can be embodied in or can include the sensing system 120, and the processing unit can be embodied in or can include the processing unit 130.

At block 820, the processing unit can store the first data in a memory device of the remote sensing system. In embodiments in which the processing unit is embodied in the processing unit 130, the memory device can be embodied in or can constitute the buffer 460.

At block 830, the processing unit can configure a reception interval that corresponds to a terminal portion of the defined period. In some embodiments, the reception interval can be substantially equal to the terminal interval $(1-\alpha)T$. The reception interval can be configured based at least on a defined relative distance between a target object and the vehicle that includes the processing unit and can be controlled according to the example method 800. In one embodiment, the processing unit can configure the reception interval iteratively, adjusting the reception interval until generating a satisfactory reception interval that yields a defined amount of SNR. The configuration need not be static and, in some embodiments, the processing unit can configure multiple reception intervals corresponding to respective detection ranges.

At block 840, the processing unit can remove, from the first data, second data representative of second EM signal generated during a first interval of the defined period, resulting in third data representative of third EM signal received during the reception interval. The first interval and the reception interval can span the defined period. Accordingly, in some embodiments, the first interval can be substantially equal to $\alpha T$.

At block 850, the processing unit can generate a range-Doppler map by processing or otherwise operating on the third data. In one aspect, processing the third data can include performing an FFT operation on the third data. At block 860, a control system functionally coupled to the processing unit can control motion of the vehicle (e.g., the vehicle 105) based at least on the range-Doppler map. While not shown in FIG. 8, in additional or alternative embodiments, the control system can augment an operation of the vehicle based at least on the range-Doppler map. The control system can be embodied in or can include, for example, the control system 610.

Figure 9:
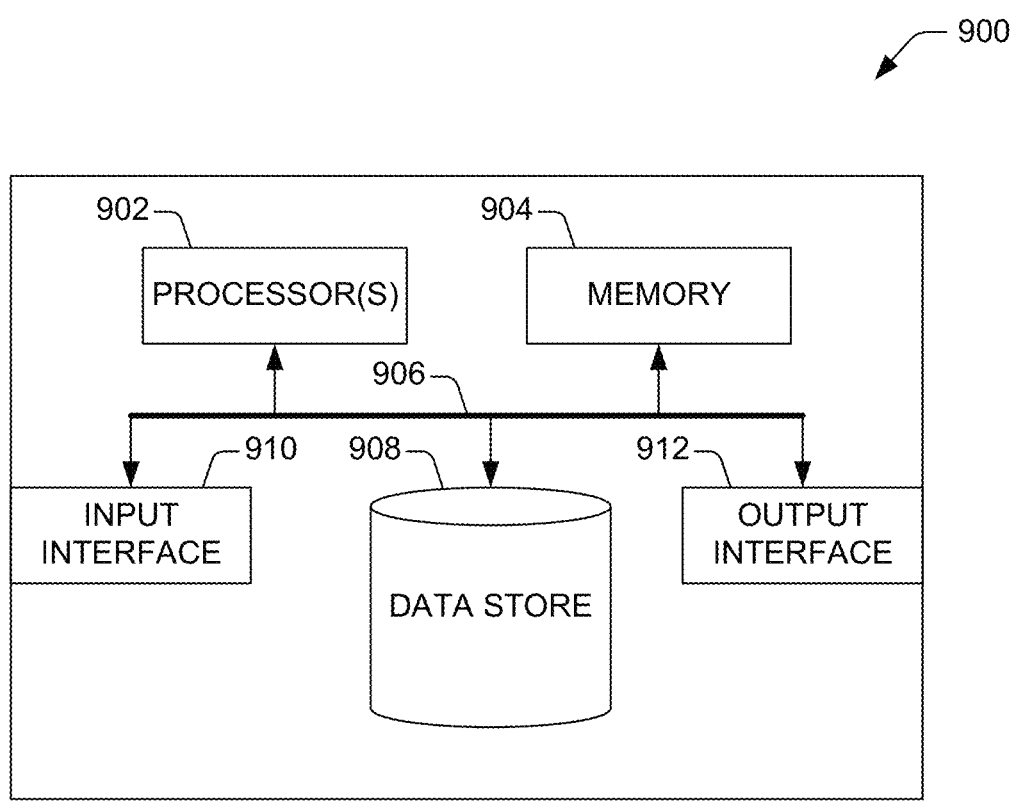
FIG. 9 illustrates an example of a computing system that can implement the technologies disclosed herein, in accordance with one or more embodiments.

FIG. 9 illustrates an example computing device 900 that can be used in accordance with the systems and methodologies disclosed herein. For instance, the computing device 900 may be or include the control system 610. The computing device 900 includes at least one processor 902 that executes instructions that are stored in a memory 904. The instructions may be, for instance, instructions for implementing functionality described as being carried out by one or more modules and systems discussed above or instructions for implementing one or more of the methods described above. The processor 902 may be a CPU, a plurality of CPUs, a GPU, a plurality of GPUs, a multi-core processor, etc. The processor 902 may access the memory 904 by way of a system bus 906. In addition to storing executable instructions, the memory 904 may also store confidence scores, prior probability data, sensor data, training data, etc.

The computing device 900 additionally includes a data store 908 that is accessible by the processor 902 by way of the system bus 906. The data store 908 may include executable instructions, sensor data, probability data, training data, confidence scores, etc. The computing device 900 also includes one or more input interface devices 910 (generically referred to as input interface 910) that allows external devices to communicate with the computing device 900. For instance, the input interface 910 may be used to receive data and/or instructions from an external device, etc. The computing device 900 also includes one or more output interface devices 912 (generically referred to as output interface device 912 that can interface the computing device 900 with one or more external devices. For example, the computing device 900 may transmit control signals to the engine 620, the braking system 630, and/or the steering system 640 by means of at least one of the output interface 912.

While illustrated as a single system, it is noted that the computing device 900 may also be embodied in a distributed system. Thus, for instance, several devices may be in communication by way of a network connection and may collectively perform operations or tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with laser devices. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle, comprising:
   a sensing system comprising:
      a transmitter module that emits first electromagnetic radiation during a defined period, the first electromagnetic radiation modulated according to a frequency modulated continuous wave (FMCW) waveform, the defined period comprises a leading interval and a terminal interval;
      a receiver module configured to receive second electromagnetic radiation responsive to the first electromagnetic radiation, the second electromagnetic radiation corresponding to a reflection of a portion of the first electromagnetic radiation by an object in a region relative to the vehicle; and
      a switching component that causes the receiver module to operate during the terminal interval of the defined period, wherein the switching component causes the receiver module to be non-operative during the leading interval of the defined period.

2. The vehicle of claim 1, wherein the terminal interval corresponds to a defined fraction of the defined period, the defined fraction is a rational number.

3. The vehicle of claim 1, wherein the terminal interval spans a time interval within the defined period based at least on a defined range of a target object relative to the vehicle.

4. The vehicle of claim 1, wherein the switching component comprises a clocking device that causes the receiver module to operate with a duty cycle corresponding to the terminal interval.

5. The vehicle of claim 1, wherein the sensing system comprises one of a radar system or a light detection and ranging (lidar) system, and wherein the first electromagnetic radiation includes one of radiofrequency (RF) waves or laser beams.

6. The vehicle of claim 1, wherein the receiver module processes at least a portion of the second electromagnetic radiation during the terminal interval of the defined period.

7. The vehicle of claim 1, wherein the receiver module receives at least a portion of the second electromagnetic radiation during the terminal interval of the defined period.

8. The vehicle of claim 7, wherein the sensing system comprises a mixer module that mixes a first electromagnetic signal indicative of the first electromagnetic radiation and second electromagnetic signal indicative of at least the portion of the second electromagnetic radiation, resulting in third electromagnetic signal having a continuous wave portion.

9. The vehicle of claim 8, wherein:
   the sensing system comprises a processing unit that determines a range-Doppler map based at least on data representative of the third electromagnetic signal; and
   the vehicle further comprising a control system that implements a process to control an operation of the vehicle based at least on the range-Doppler map.

10. A sensing system, comprising:
    a transmitter module that emits first electromagnetic radiation during a defined period, the first electromagnetic radiation modulated according to one of a frequency modulated continuous wave (FMCW) waveform or an amplitude modulated continuous wave (AMCW) waveform, the defined period comprises a leading interval and a terminal interval;
    a receiver module configured to receive second electromagnetic radiation responsive to the first electromagnetic radiation, the second electromagnetic radiation corresponding to a reflection of a portion of the first electromagnetic radiation by an object in a region relative to the sensing system; and
    a switching component that causes the receiver module to operate during the terminal interval of the defined period, wherein the switching component causes the receiver module to be non-operative during the leading interval of the defined period.

11. The sensing system of claim 10, wherein the terminal interval spans a time interval within the defined period based at least on a defined range of a target object relative to the system.

12. The sensing system of claim 10, wherein the terminal interval corresponds to a defined fraction of the defined period, the defined fraction is a rational number.

13. The sensing system of claim 10, wherein the receiver module receives at least a portion of the second electromagnetic radiation during the terminal interval.

14. The sensing system of claim 13, further comprising a mixer module that mixes a first electromagnetic signal indicative of the first electromagnetic radiation and second electromagnetic signal indicative of at least the portion of the second electromagnetic radiation, resulting in third electromagnetic signal having a continuous wave portion.

15. A method, comprising:
    receiving, by a processing unit comprising processing circuitry, first data representative of electromagnetic signal generated at a remote sensing system during a defined period, the electromagnetic signal including a beat signal portion; and
    removing, by the processing unit, from the first data, second data representative of second electromagnetic signal generated during a first interval of the defined period, the removing resulting in third data representative of third electromagnetic signal generated during a second interval after the first interval, the first interval and the second interval span the defined period.

16. The method of claim 15, wherein the remote sensing system is mounted on a vehicle and comprises one of a radar system or a light detection and ranging (lidar) system, the removing comprising filtering the second data over about an initial half of the defined period.

17. The method of claim 15, further comprising configuring, by the processing unit, prior to the removing, the first interval based at least on a relative distance between the remote sensing system and an object in a region surrounding the remote sensing system.

18. The method of claim 15, further comprising configuring, by the processing unit, prior to the removing, the first interval as a defined fraction of the defined period, wherein the defined fraction is a rational number.

19. The method of claim 15, further comprising operating on the third data by the processing unit, the operating comprises determining a range-Doppler map.

20. The method of claim 18, further comprising implementing, by a controller system functionally coupled to the processing unit, a process to control an operation of a vehicle based at least on the range-Doppler map, wherein the vehicle includes the remote sensing system.

* * * * *